United States Patent
Golen et al.

(10) Patent No.: US 11,285,892 B2
(45) Date of Patent: Mar. 29, 2022

(54) SEAT MODULE FOR CABLE ARRANGEMENT

(71) Applicant: HI-LEX CONTROLS, INC., Rochester Hills, MI (US)

(72) Inventors: Heather Ann Golen, Fenton, MI (US); Kevin Richard Koneval, Macomb, MI (US); Ichiro Okuno, Rochester Hills, MI (US); Ellen Marisa Kauten, Royal Oak, MI (US)

(73) Assignee: HI-LEX CONTROLS, INC., Rochester Hills, MI (US)

( * ) Notice: Subject to any disclaimer, the term of this patent is extended or adjusted under 35 U.S.C. 154(b) by 0 days.

(21) Appl. No.: 16/998,538

(22) Filed: Aug. 20, 2020

(65) Prior Publication Data

US 2022/0055552 A1 Feb. 24, 2022

(51) Int. Cl.
*B60R 16/037* (2006.01)
*B60R 16/02* (2006.01)
*B60N 2/02* (2006.01)

(52) U.S. Cl.
CPC ........ *B60R 16/0215* (2013.01); *B60R 16/037* (2013.01); *B60N 2002/0264* (2013.01)

(58) Field of Classification Search
CPC .............. B60R 16/0215; B60R 16/037; B60N 2002/0264
USPC ....................................................... 174/72 R
See application file for complete search history.

(56) References Cited

U.S. PATENT DOCUMENTS

| 6,429,544 | B1 | 8/2002 | Sasaki et al. |
| 8,226,145 | B2 | 7/2012 | Kasuya et al. |
| 8,957,311 | B2 | 2/2015 | Shimada |
| 9,481,327 | B2 | 11/2016 | Shibata et al. |
| 9,878,680 | B2* | 1/2018 | Mita ........................ B60N 2/68 |
| 10,252,651 | B2* | 4/2019 | Bhatia ................. B60N 2/2887 |
| 2003/0098661 | A1* | 5/2003 | Stewart-Smith ..... B60N 2/0244 318/445 |
| 2008/0265649 | A1 | 10/2008 | McMillen et al. |

(Continued)

FOREIGN PATENT DOCUMENTS

| FR | 3030391 A3 | 6/2016 |
| JP | 3868749 B2 | 1/2007 |

(Continued)

OTHER PUBLICATIONS

International Search Report and Written Opinion of PCT/US2021/043886, dated Nov. 15, 2021.

*Primary Examiner* — Timothy J Thompson
*Assistant Examiner* — Michael F McAllister
(74) *Attorney, Agent, or Firm* — Dickinson Wright PLLC

(57) ABSTRACT

A seat module attached to a seat having mechanical parts for seat actuation in a motor vehicle includes at least one mechanical control cable for the seat actuation, and a module plate formed with a mounting feature for attaching to the seat and a retention feature for attaching the mechanical control cable. An end portion of the mechanical control cable is temporarily stowed on the module plate in a pre-assembled state where the mechanical control cable is attached to the module plate, and the end portion of the mechanical control cable is connected to the mechanical parts of the seat in an assembled state where the module plate with the attached mechanical control cable is securely mounted to the seat.

20 Claims, 5 Drawing Sheets

(56) References Cited

U.S. PATENT DOCUMENTS

| | | | |
|---|---|---|---|
| 2010/0027232 A1* | 2/2010 | Kasuya | B60R 16/0215 |
| | | | 361/807 |
| 2013/0146354 A1 | 6/2013 | Shimada | |
| 2017/0283068 A1* | 10/2017 | Udriste | G08C 17/02 |
| 2018/0072199 A1 | 3/2018 | Strumolo et al. | |
| 2019/0031121 A1 | 1/2019 | Sato | |

FOREIGN PATENT DOCUMENTS

| JP | 201266364 A | 4/2012 |
|---|---|---|
| JP | 5410041 B2 | 2/2014 |
| JP | 5960310 B2 | 8/2016 |
| WO | 2010076479 A1 | 7/2010 |
| WO | 2012144660 | 10/2012 |
| WO | 2016012678 A1 | 1/2016 |

\* cited by examiner

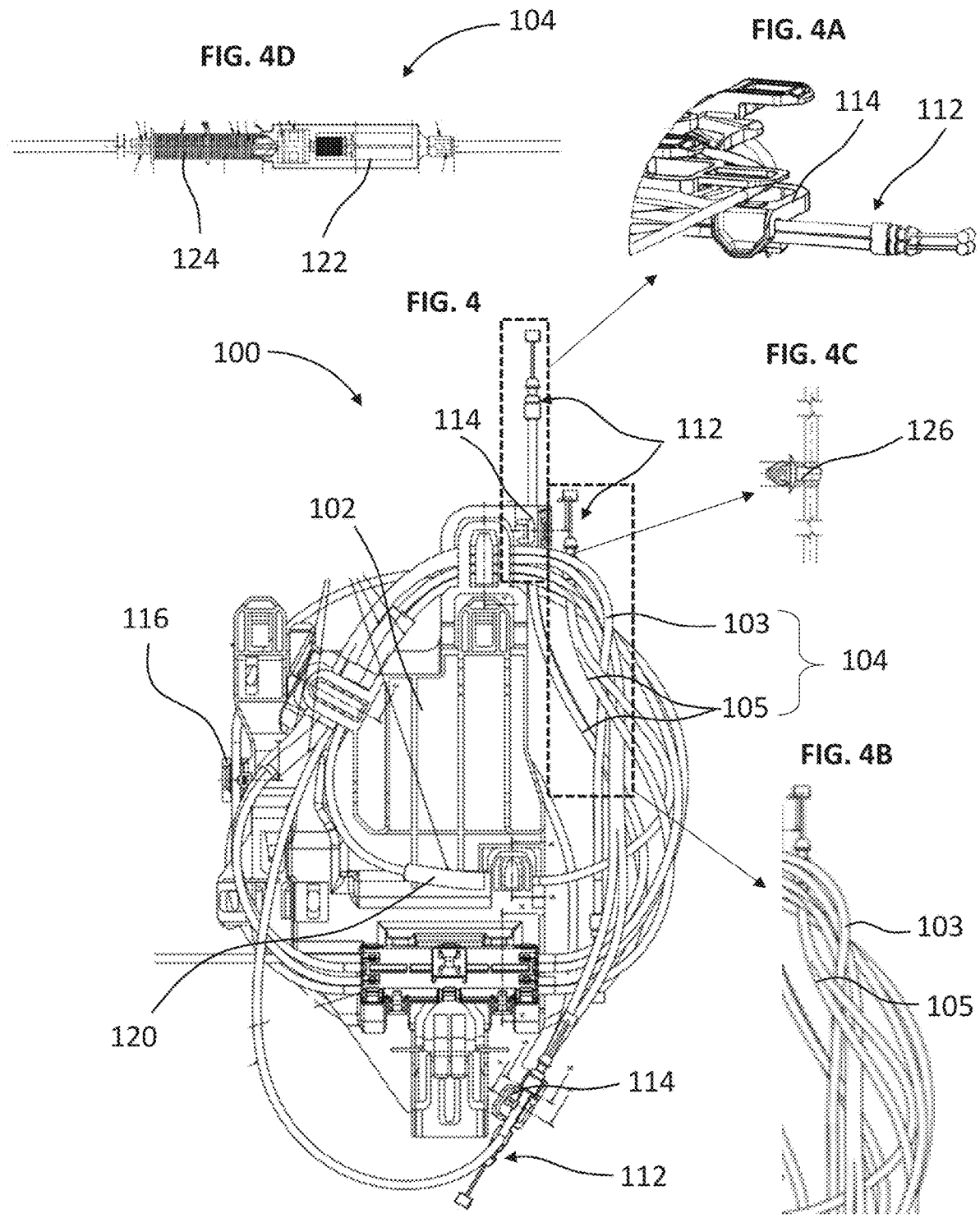

SEAT MODULE FOR CABLE ARRANGEMENT

TECHNICAL FIELD

This present disclosure relates to a seat module that retains mechanical control cables for seat actuation potentially suited for various application but in a preferred implementation utilized in an automotive seat assembly.

BACKGROUND

The statements in this section merely provide background information related to the present disclosure and may not constitute prior art.

Mechanical control cables for seat actuation are directly mounted to a seat frame in an automotive seat. Each of the mechanical control cables is routed one by one when they are connected to mechanical parts such as levers or latch systems in the automotive seat. For example, in an ordinary conventional seat of a motor vehicle, each of the mechanical control cables is individually fastened to a bracket by binder members such as zip ties or adhesive tapes for retaining the mechanical control cables in their routed positions. Thus, each of the mechanical control cables is independently retained in a seat frame with its predetermined shape respectively.

The conventional seat assembly with the mechanical control cables requires a large number of brackets and binder members for retaining the cables to the seat frame, and a bothersome operation of attaching many components to the seat frame such that the seat assembly is a long and awkward assembly process with greater variability. For example, changes in the position of the mechanical control cable conduit affect the length of a core wire within each of the mechanical control cables. If the core wire is too short or too long when the mechanical control cables are attached to the seat frame, seat actuation may not be achievable so that the mechanical control cables need to be rerouted and reattached. This is a disadvantage for the conventional assembly process of the seat with the mechanical control cables.

In addition, it is necessary to attach the mechanical control cables to the lower part of the seat through a limited space enclosed by seat rails, metal brackets, various mechanism components, and already attached mechanical parts. Therefore, longer working process for the attachment and many numbers of parts including binder members are needed for connecting the mechanical control cables to the mechanical parts. Especially in attachment of the mechanical control cables to the lower part of the seat, the mechanical control cables have many penetrated arranging spots, and furthermore need to be arranged within the limited space as described above. For this reason, poor arranging workability will be presented, causing possible damage by involvement of the mechanical control cables, etc.

As described above, the ordinary seat assembly with the mechanical control cable includes the retaining members such as brackets or zip-ties for attaching the cables to the seat frame. The ordinary seat assembly with the retaining elements for the mechanical control cables will have more manufacturing steps. Accordingly, there is constantly a desire to simplify the assembled components and steps of the ordinary seat assemblies with the mechanical control cables. In addition, there is more desire to reduce cost and weight of automotive components, while providing a desirable durability, low warranty claims, and compliance with performance requirements.

SUMMARY

The present disclosure relates to a seat module retaining mechanical control cables utilized in an automotive seat assembly. In particular, the present disclosure relates to the seat module temporarily stowing the attached mechanical control cables in a pre-assembled state, and the stowed mechanical control cables are released and connected to mechanical parts for the seat actuation in an assembled state after the seat module is securely mounted to the seat.

By using the seat module, the mechanical control cables could be shipped to the customer in the pre-assembled state in their routed condition by retaining the cables to a module plate. In the pre-assembled state, furthermore, the loose cable end portions would be temporarily stowed prior to shipment to reduce tangling and improve assembly at the customer. The customer would snap the seat module to the seat frame with the cable end portions, which are still stowed in the module plate. Then the customer un-stows the cable end portions and connects the cable end portions to the mechanical parts such as frame levers and latches as needed in the assembled state. This would eliminate the need for attaching brackets and zip ties for retaining the cables to the seat frames. In addition, repeatability of routing is greatly improved, and also ensuring seat actuation is achieved.

According to an aspect of the present disclosure, the seat module attached to the automotive seat having the mechanical parts for seat actuation in a motor vehicle includes at least one mechanical control cable for the seat actuation and a module plate formed with a mounting feature for attaching to the seat and a retention feature for attaching the mechanical control cable. An end portion of the mechanical control cable is temporarily stowed on the module plate in a pre-assembled state where the mechanical control cable is attached to the module plate and the end portion of the mechanical control cable is connected to the mechanical parts of the seat in an assembled state where the module plate with the attached mechanical control cable is securely mounted to the seat.

According to a further aspect of the present disclosure, the end portion of the mechanical control cable stowed in the pre-assembled state is retained in the module plate while the module plate is mounted to the seat and is released for connecting to the mechanical parts of the seat in the assembled state of the module plate.

According to a further aspect of the present disclosure, the retention feature is formed as a mechanical-lock type and located in at least one location of the module plate for retaining at least one portion of the mechanical control cable. In addition, the retention feature is configured to position the mechanical control cables in a correct location for reducing positioning variation of the mechanical control cables in the assembled state.

According to a further aspect of the present disclosure, the module plate includes a stowing feature formed and located in at least one location of the module plate for temporarily retaining the end portion of the mechanical control cable in the pre-assembled state and allowing the end portion of the mechanical control cable to be released for connecting to the mechanical parts of the seat in the assembled state. The stowing feature is formed with a mechanical-lock type for releasably retaining the end portion of the mechanical control cable.

According to a further aspect of the present disclosure, the end portion of the mechanical control cable is temporarily stowed by tucking under or above one of the mechanical control cables on the module plate in the pre-assembled state. Each of the mechanical control cables includes a pad, an adjuster, a spring, or any control cable components.

According to a further aspect of the present disclosure, the module plate further includes a loom protruding from a side of the module plate and being located in at least one location on the module plate. The loom is configured to retain a portion of a long looped mechanical control cable.

According to a further aspect of the present disclosure, the module plate is formed of a resin material or a composite material such as a glass woven plastic composite sheet.

According to a further aspect of the present disclosure, the seat module includes additional components retained in the module plate for actuating a power mechanism of the seat.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which:

FIG. 4 shows a plan view of the seat module in a pre-assembled state in accordance with an embodiment of the present disclosure, FIG. 4A shows a detailed view of an end of the mechanical control cable stowed by a stowing feature formed in the module plate of FIG. 4, FIG. 4B shows a detailed view of an end of the mechanical control cable stowed by tucking in the seat module of FIG. 4, FIG. 4C shows a detailed view of a clip for attaching to the module plate; and FIG. 4D shows a detailed view of an adjuster and a spring element assembled with the mechanical control cable.

Figure 1:
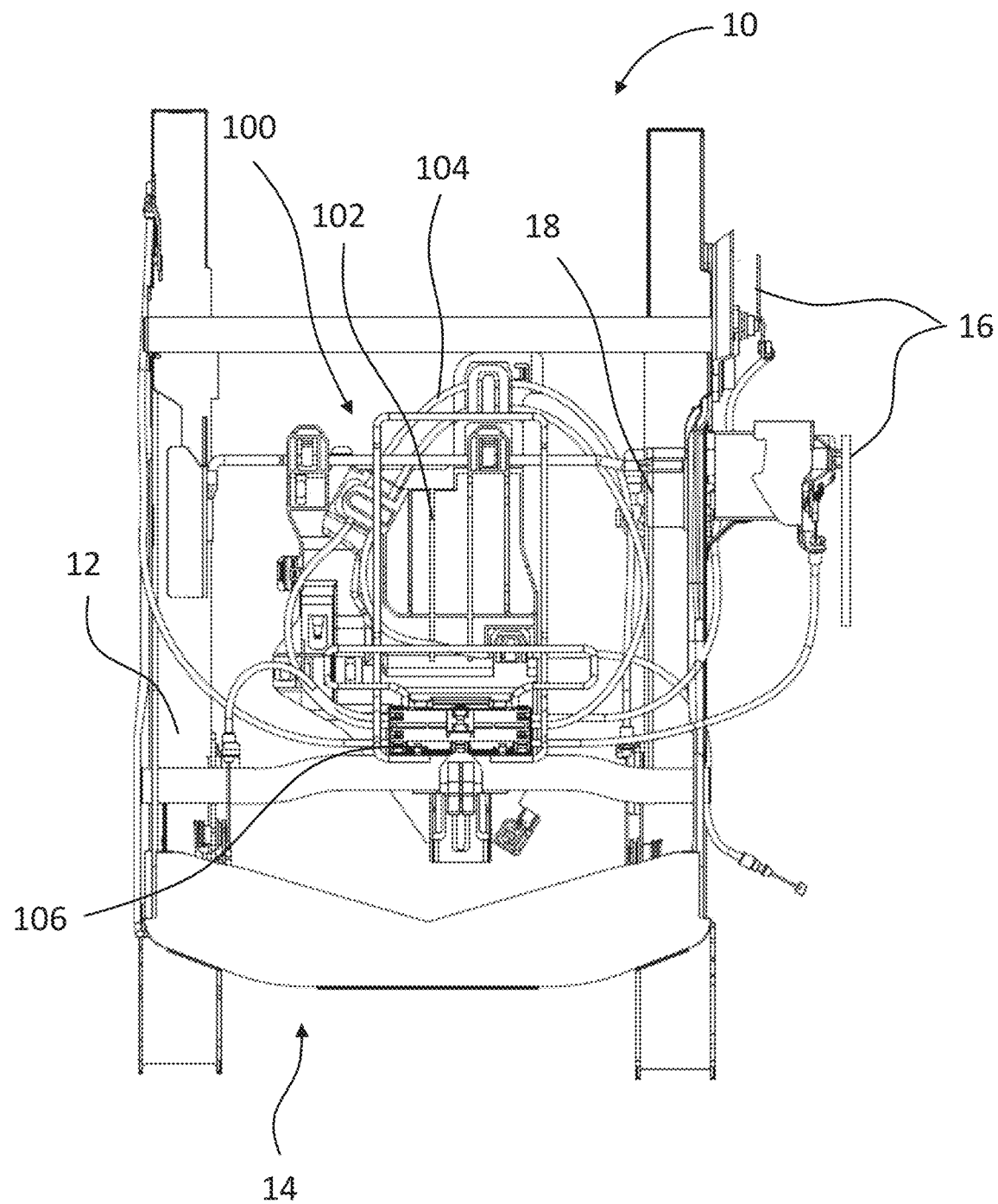
FIG. 1 shows a plan view of a seat module attached to a cushion frame in an automotive seat in accordance with an embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a lower part of a seat unit 10 for a motor vehicle. The seat unit 10 typically includes a pair of rails 12 adapted to be fixed to a floor panel (not shown) of the motor vehicle for back-and-forth motion and a seat cushion (not shown) attached to a cushion frame 14 for up-and-down motion, a seatback (not shown) attached to the cushion frame 14 above the rails 12, and mechanical parts 16 such as levers or latch systems coupled to the movable sections of the seat unit 10. The mechanical parts 16 are generally attached to the cushion frame 14 for adjusting the seat position and actuated by connected mechanical control cables 104. The seat unit 10 is generally designed to move the seat cushion backward, forward, upward, and downward with respect to the floor panel, and to cause the seatback to recline. The seat unit 10 further includes a seat module 100 attached to the cushion frame 14.

In FIG. 1, the seat module 100 includes a module plate 102 and at least one mechanical control cable 104. Generally, more than one mechanical control cables 104 are bundled together by a cable bundle housing 106, which is attached to the module plate 102, or each of the mechanical control cables 104 is individually attached to the module plate 102 without the cable bundle housing 106. As shown in FIG. 1, the seat module 100 is securely mounted to the cushion frame 14 under the seat cushion for controlling the mechanical parts 16, which were already installed to the seat unit 10 before the seat module 100 is attached to the cushion frame 14. The attached seat module 100 actuates the drive of the movable portions of the seat unit 10 such as a seat-cushion position and a reclining angle, which is mounted on the floor panel of the vehicle. In the seat unit 10, for example, the mechanical parts 16 for use with the seat module 100 having the mechanical control cables 104 are the levers and latch mechanisms associated with seat adjustment.

Figure 2:
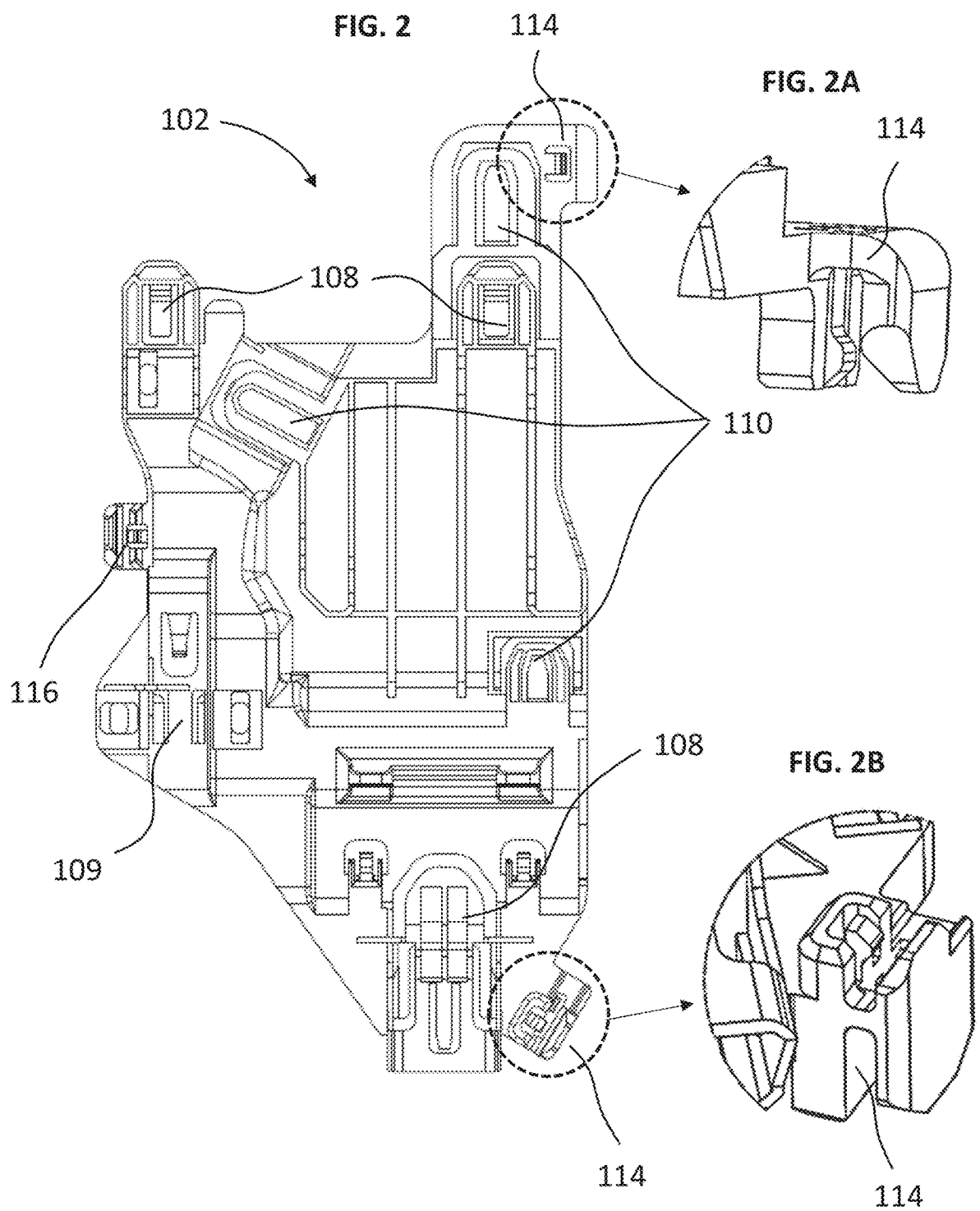
FIG. 2 shows a plan view of a module plate in the seat module of FIG. 1, and FIGS. 2A and 2B show detailed views of stowing features of the module plate of FIG. 2.

FIG. 2 illustrates the module plate 102 designed to fit within the given packaging space under the seat cushion and fixed to the cushion frame 14 of the seat unit 10. The structure, dimension, shape, material, and number of pieces, etc. of the module plate 102 are not particularly limited. In addition, the module plate 102 is generally made of a resin material. The resin material is not particularly limited, and various resin materials may be used. According to an exemplary form of the present disclosure, the module plate 102 of the seat module 100 is formed with a glass filled resin such as a Polypropylene (PP) or a Polyamide (PA), etc. The module plate 102 formed with the PP or PA has benefits for easy assembly and repeatability when the seat module 100 is attached to the seat unit 10.

According to other form of the present disclosure, the module plate 102 of the seat module 100 is also formed of a composite material such as a glass woven plastic composite sheet (ex. an organo sheet). In particular, when the seat module 100 formed of the glass woven plastic composite sheet is attached to the seat unit 10, the module plate 102 is itself structurally used in the seat unit 10 instead of metal components which structurally strengthening the seat unit 10. Accordingly, the module plate 102 with the attached mechanical control cables 104 also structurally supports the seat unit 10 in addition to providing with the organized mechanical control cables 104 for the seat actuation.

In FIGS. 1 and 2, the module plate 102 of the seat module 100 is attached to the cushion frame 14 of the seat unit 10 via a mounting feature 108, which is formed in multiple locations in the module plate 102. According to an exemplary form of the present disclosure, the mounting feature 108 is formed as a mechanical-lock type such as a snap-fit or a press-fit for allowing the seat module 100 to be securely mounted to the cushion frame 14 of the seat unit 10. In FIGS. 1 and 2, for example, the mounting features 108 are located in three (3) locations for attaching the seat module 100 to the cushion frame 14 of the seat unit 10. However, the mounting features 108 may be formed with other types such as a rivet according to other forms of the present disclosure. Due to the mounting features 108 formed in the module plate 102, the seat module 100 with the mechanical control cables 104 is securely mounted to the cushion frame 14 of the seat unit 10 for the seat actuation. In addition, as shown in FIG. 2, the module plate 102 includes a holding feature 109 for attaching additional components such as a seat actuator 118 (see FIG. 3A) or a wire harness, etc. The attached seat actuator 118 is configured to electrically control or adjust the seat position with a power mechanism 18 installed in the seat unit 10.

Figure 3:
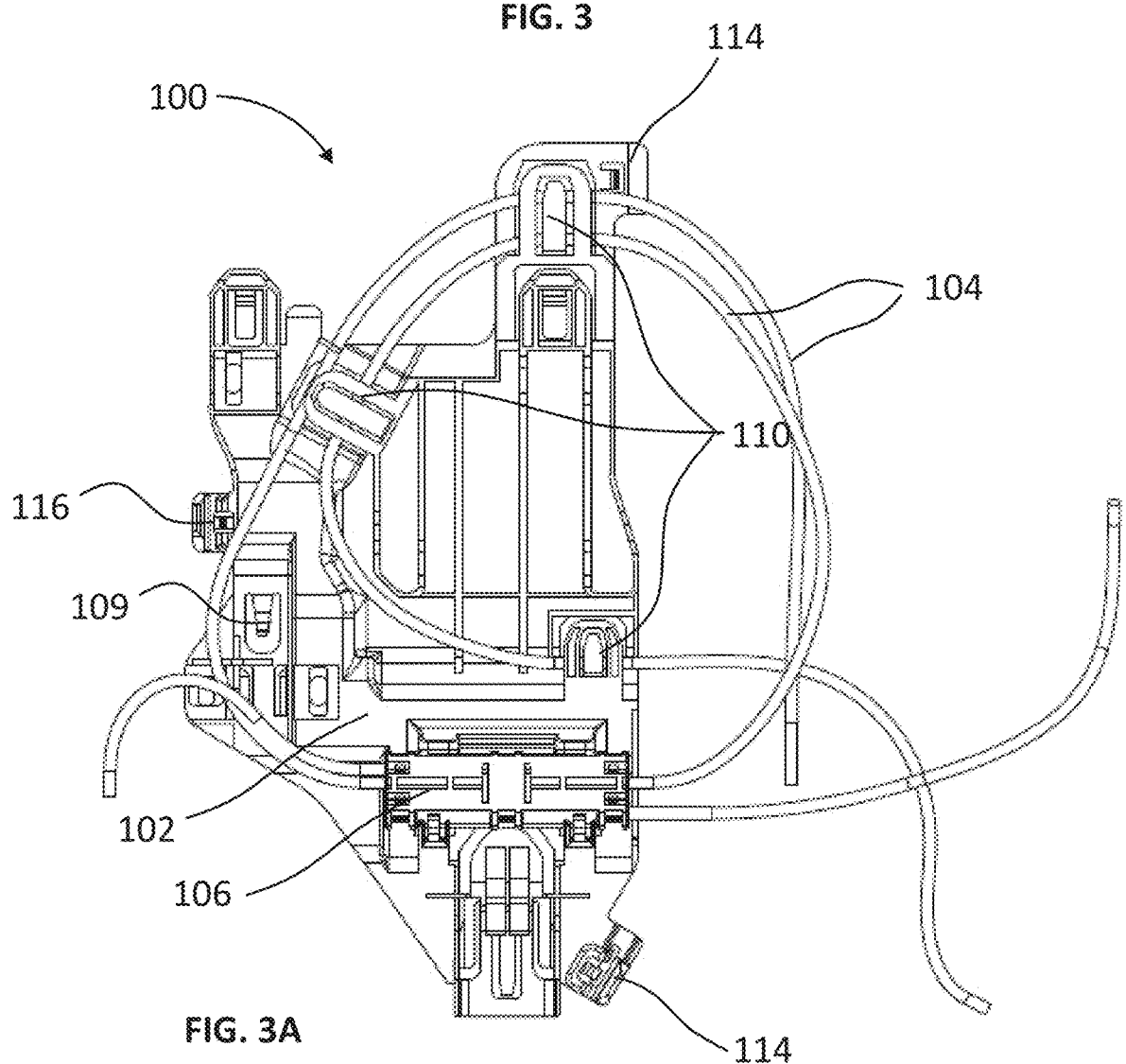
FIG. 3 shows a plan view of mechanical control cables routed and retained in the module plate of FIG. 2.
Figure 3A:
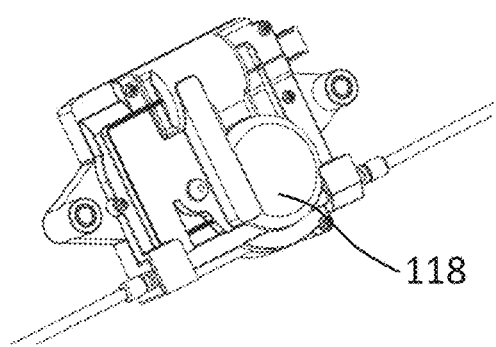
FIG. 3A shows a seat actuator for attaching to the module plate of FIG. 3.

In FIG. 2, the module plate 102 further includes a retention feature 110. The retention feature 110 is located in multiple locations of the module plate 102 for retaining the mechanical control cables 104, which are routed and attached to the module plate 102. As shown in FIGS. 2 and 3, the retention features 110 are formed as a mechanical-lock type such as a snap-fit or a press-fit for retaining a portion of the mechanical control cables 104 when each of the mechanical control cables 104 is routed on the module plate 102. The retention feature 110 of the module plate 102 is configured to position the mechanical control cables 104 in a correct location for reducing positioning variation of the mechanical control cables 104 when the seat module 100 is assembled with the seat unit 10. Referring to FIG. 4, each of the mechanical control cables 104 includes an end portion 112 for connecting to the mechanical parts such as levers or latch systems already installed in the seat unit 10 before the seat module 100 is attached. After the seat module 100 is attached to the seat unit 10, the end portion 112 of each of the mechanical control cables 104 is connected to the mechanical parts 16 respectively and the connected mechanical control cables 104 actuate the mechanical parts 16 of the seat unit 10 for controlling the seat movement.

As shown in FIGS. 2, 2A, 2B and 4, the module plate 102 further includes a stowing feature 114 for temporarily retaining the end portion 112 of each of the mechanical control cables 104 in a pre-assembled state where the mechanical control cables 104 are attached (retained) to the module plate 102. In the pre-assembled state of the seat module 100, as shown in FIGS. 1 and 4, the end portions 112 of the routed and attached mechanical cables 104 are temporarily stowed prior to shipment to reduce tangling of the cables 104 and improve assembly process in an assembled state of the seat module 100 where the seat module 100 is securely mounted to the cushion frame 14 of the seat unit 10. In the assembled state of the seat module 100, as shown in FIG. 1, the stowed end portions 112 of the mechanical control cables 104 are released (un-stowed) from the stowing features 114 of the module plate 102 and each connected to the mechanical parts 16 such as the levers and latch systems for the seat actuation as needed.

The stowing feature 114 is formed in at least one location of the module plate. As shown in FIGS. 2 and 4, for example, the stowing features 114 are formed in two locations of the module plate 102. The stowing features 114 are also formed as a mechanical-lock type such as a snap-fit or a press-fit for releasably retaining the end portion 112 of each of the mechanical control cables 104. In the seat module 100, the end portions 112 of the attached mechanical control cables 104 are temporarily retained in the stowing features 114 of the module plate 102 in the pre-assembled state before connecting to the mechanical parts 16 of the seat unit 10. In the assembled state, the seat module 100 is attached to the cushion frame 14 of the seat unit 10 via the mounting features 108 of the module plate 102. While the seat module 100 having the stowed end portions 112 of the mechanical control cables 104 is securely mounted to the seat unit 10, the end portions 112 of the mechanical control cables 104 are retained in the stowing feature 114, and in the assembled state of the seat module 100 after the seat module 100 is mounted to the seat unit 10, the stowed end portions 112 of the mechanical control cables 104 are un-stowed (released) and connected to the mechanical parts 16 such as the levers and latch systems of the seat unit 10.

FIGS. 3 and 4 show examples of the routed and attached mechanical control cables 104 in the pre-assembled state of the seat module 100. When the cable bundle housing 106 with the mechanical control cables 104 is coupled to the module plate 102, the mechanical control cables 104 are routed and attached to the module plate 102. Some cables 103 of the attached mechanical control cables 104 rotate clockwise and the end portions 112 of the cables 103 are temporarily stowed in one of the stowing features 114 of the module plate 102. While the mechanical control cables 104 are attached to the module plate 102, at least one portion of each of the mechanical control cables 104 is held by the retention features 110 formed on the module plate 102. Other cables 105 of the attached mechanical control cables 104 rotate counter-clockwise and also the end portions 112 of the cables 105 are temporarily stowed in one of the stowing features 114 formed in the module plate 102. In addition, as described above, at least one portion of the cables 104 is held by the retention features 110 of the module plate 102.

As shown in FIG. 4, accordingly, the seat module 100 having the mechanical control cables 104 routed and attached to the module plate 102 in the pre-assembled state is configured to prevent the mechanical control cables 104 from tangling and allow the mechanical control cables 104 to be easily connected to the mechanical parts 16 when the seat module 100 is mounted to the seat unit 10 in the assembled state. Specifically, the seat module 100 according to this embodiment reduces the assembly time including the laying work and also the number of the components such as zip-ties or brackets for attaching each of the separate mechanical control cables 104 to the seat unit 10.

Figures 5, 5A:
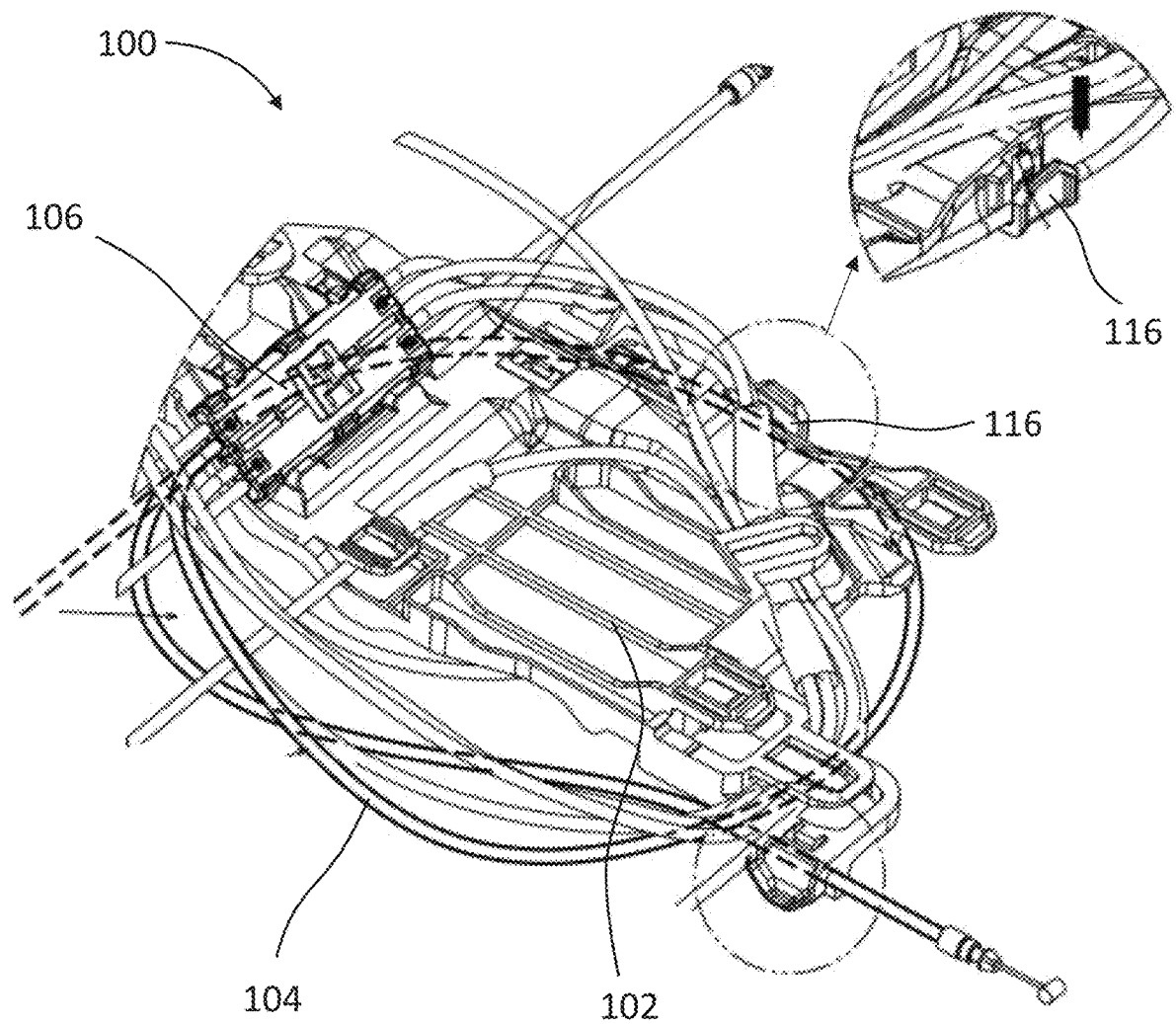
FIG. 5 shows a plan view of a loom protruding from the module plate of FIG. 2.
FIG. 5A shows a detailed view of the loom of FIG. 5.

Referring to FIGS. 5 and 5A, the module plate 102 further includes a loom 116 protruding from a side of the module plate 102. The loom 116 is located in at least one location of the module plate 102 and configured to retain a portion of the mechanical control cables 104. In FIG. 5, one of the attached mechanical control cables 104 is quite long and loops in a complete circle on the underside of the module plate 102. The protruded loom 116 at the side of the module plate 102 is used to retain a portion of the long looped control cable 104. In addition, when there is no place on the upper side of the module plate 102 to accommodate the mechanical control cables 104, the cables 104 are looped on an underside of the module plate 102 (see dashed-lines in FIG. 5) for preventing the tangling of the cables 104 in the pre-assembled state. According to other forms of the present disclosure, the loom is configured to temporarily retain a long mechanical control cable for connecting the end portion of the long mechanical control cable to another mechanical part, which is located far from the mounted seat module 100 (ex. an upper side of the seatback frame) such that the protruded loom 116 prevents the attached long mechanical control cables from tangling before mounting to the seat unit 10 in the pre-assembled state and allows the cables to easily release (un-stow) and connect to one of the mechanical parts 16 in the seatback frame in the assembled state.

As shown in FIGS. 4 and 4A, the end portions 112 of the mechanical control cables 104 are generally snapped in the stowing features 114 of the module plate 102 for reducing tangling of the mechanical control cables 104 in the pre-assembled state. According to another exemplary form of the present disclosure, a different method for temporarily stowing the end portion 112 of the mechanical control cable 104 is also illustrated in FIGS. 4 and 4B. In the pre-assembled state of the seat module 100, the end portion 112 of one of the mechanical control cables 105 attached to the module plate 102 is temporarily stowed by tucking under or above one of the other cables 103 as shown in FIG. 4B. After the seat module 100 is attached to the seat unit 10, the stowed end of the mechanical control cables 104 by tucking is un-stowed (released) and connected to a predetermined mechanical parts 16 of the seat unit 10 in the assembled state as shown in FIG. 1. Accordingly, in the pre-assembled state of the seat module 100, the end portions 112 of the mechanical control cables 104 are temporarily stowed by either the stowing feature 114 formed on the module plate 102 or tucking under or above the other cables 104 for reducing tangling and improving assembly with the seat unit 10.

In addition, FIG. 4 illustrates the detailed mechanical control cables 104. Each of the mechanical control cables 104 includes a pad 120, an adjuster 122, a spring 124, a clip 126 or any other typical control cable components for controlling the mechanical parts 16 of the seat unit 10. In the seat module 100, accordingly, the assembled mechanical control cables 104 with the control cable components including the pad 120, the adjuster 122, the spring 124, a clip 126, etc. are routed and attached to the module plate 102.

Furthermore, as shown in FIG. 1, the seat module 100 may be applied as a trim surface of the seat unit 10. In FIG. 1, the mounted seat module 100 under the seat cushion is configured to be a part of the trim surface of the lower part of the seat unit 10. In the assembled state, the attached seat module 100 in the seat unit 10 may be a part of the class-A surface such that an original trim piece used in the base of the cushion frame 14 for cosmetic purposes is replaced with the attached seat module 100. Accordingly, the attached module plate 102 having the mechanical control cables 104 under the cushion is used as the class-A surface of the seat unit 10, so that it effectively reduces the weight and assembly time including the manufacturing costs.

While the above description constitutes the preferred embodiments of the present invention, it will be appreciated that the invention is susceptible to modification, variation and change without departing from the proper scope and fair meaning of the accompanying claims.

What is claimed is:

1. A seat module attached to a seat having mechanical parts for seat actuation in a motor vehicle, the seat module comprising:
   at least one mechanical control cable for the seat actuation; and
   a module plate formed with a mounting feature for attaching to the seat and a retention feature for attaching the mechanical control cable,
   wherein an end portion of the mechanical control cable is temporarily stowed on the module plate in a pre-assembled state where the mechanical control cable is attached to the module plate, and the end portion of the mechanical control cable is connected to the mechanical parts of the seat in an assembled state where the module plate with the attached mechanical control cable is securely mounted to the seat.

2. The seat module of claim 1, wherein the end portion of the mechanical control cable stowed in the pre-assembled state is retained in the module plate while the module plate is mounted to the seat, and is released for connecting to the mechanical parts of the seat in the assembled state of the module plate.

3. The seat module of claim 1, wherein the retention feature is formed as a mechanical-lock type and located in at least one location of the module plate for retaining at least one portion of the mechanical control cable.

4. The seat module of claim 1, wherein the retention feature is configured to position the mechanical control cables in a correct location for reducing positioning variation of the mechanical control cables in the assembled state.

5. The seat module of claim 1, wherein the module plate includes a stowing feature formed and located in at least one location of the module plate for temporarily retaining the end portion of the mechanical control cable in the pre-assembled state and allowing the end portion of the mechanical control cable to be released for connecting to the mechanical parts of the seat in the assembled state.

6. The seat module of claim 5, wherein the stowing feature is formed with a mechanical-lock type for releasably retaining the end portion of the mechanical control cable.

7. The seat module of claim 1, wherein the end portion of the mechanical control cable is temporarily stowed by tucking under or above one of the mechanical control cables on the module plate in the pre-assembled state.

8. The seat module of claim 1, wherein the module plate further includes a loom protruding from a side of the module plate and being located in at least one location on the module plate.

9. The seat module of claim 8, wherein the loom is configured to retain a portion of a long looped mechanical control cable.

10. The seat module of claim 1, wherein each of the mechanical control cables includes a pad, an adjuster, a spring, or any control cable components.

11. The seat module of claim 1, wherein the module plate is formed of a resin material.

12. The seat module of claim 1, wherein the module plate is formed of a composite material such as a glass woven plastic composite sheet.

13. The seat module of claim 1, wherein the seat module further includes an additional component retained in the module plate for actuating a power mechanism of the seat.

14. A method for producing a motor vehicle seat structure having mechanical parts for seat actuation, the method comprising the steps of:
   providing at least one mechanical control cable,
   providing a module plate adapted to be attached to a portion of the seat structure;
   coupling the at least one mechanical control cable to the module plate;
   stowing an end portion of the mechanical control cable in at least one location of the module plate, thereby producing a seat module subassembly defined as a pre-assembled state of the seat module;
   attaching the seat module subassembly to a portion of the seat structure defined as an assembled state;
   releasing the stowed end portion of the mechanical control cable from the module plate in the assembled state; and
   connecting the end portion of the mechanical control cable to the mechanical parts of the seat.

15. The method of claim 14, wherein the end portion of the mechanical control cable is temporarily stowed and retained in a stowing feature of the module plate in the seat module subassembly.

16. The method of claim 14, wherein the module plate includes a retention feature formed as a mechanical-lock type and located in the at least one location of the module plate for coupling at least one portion of the mechanical control cables.

17. The method of claim 14, wherein the module plate is formed with a mounting feature in at least one location of the module plate to attach the seat module subassembly to the seat structure.

18. The method of claim 14, further comprising the step of tucking temporarily the end portion of the mechanical control cable under or above one of the mechanical control cables coupled with the module plate in the seat module subassembly.

19. The method of claim 14, further comprising the step of placing a portion of a long looped mechanical control cable in a loom formed in a side of the module plate in the seat module subassembly.

20. The method of claim 14, further comprising the step of providing an additional component to place in the module plate for actuating a power mechanism of the seat.

* * * * *